United States Patent [19]
Eckert et al.
[11] 4,326,904
[45] Apr. 27, 1982

[54] HEAT COLLAPSING FOAM SYSTEM

[75] Inventors: Rene A. Eckert, Simpsonville; Guenter E. Schmuck, Greenville, both of S.C.

[73] Assignee: National Starch and Chemical Corporation, Bridgewater, N.J.

[21] Appl. No.: 152,696

[22] Filed: Jun. 2, 1980

[51] Int. Cl.³ ......................... B32B 31/26; B05D 3/00

[52] U.S. Cl. .......................................... 156/85; 8/477; 156/238; 156/324; 156/499; 156/555; 252/8.6; 252/174.22; 252/307; 252/321; 252/362; 264/52; 427/226; 427/389.9; 427/394; 428/290

[58] Field of Search ...................... 8/477, 904; 156/78, 156/84, 155, 307.1, 307.3, 309.6, 499, 555, 238, 85, 324; 252/174.22, 8.6, 307, 321, 362; 264/50, 52; 427/226, 244, 246, 389.9, 394; 428/290, 310, 904

[56] References Cited

U.S. PATENT DOCUMENTS

| | | | |
|---|---|---|---|
| 3,030,232 | 4/1962 | Morgenstern | 8/477 X |
| 3,844,862 | 10/1974 | Sauer et al. | 156/238 X |
| 3,989,869 | 11/1976 | Neumaier et al. | 427/244 X |
| 4,023,526 | 5/1977 | Ashmus et al. | 427/244 X |

OTHER PUBLICATIONS

Schwartz, Anthony M. et al., *Surface Active Agents*, New York: Interscience Publishers, Inc. (1949), pp. 514–517.

*Primary Examiner*—Edward C. Kimlin
*Assistant Examiner*—Robert A. Dawson
*Attorney, Agent, or Firm*—Dressler, Goldsmith, Shore, Sutker & Milnamow, Ltd.

[57] ABSTRACT

A process of treating sheet materials with an aqueous treating composition is disclosed in which surfactants are incorporated in the composition to permit it to be foamed with gas to provide a foam which is stable in the form of a thin layer long enough to be handled, but which will collapse completely when heated. This is preferably done by employing a mixture of water soluble surfactant to stabilize the foam and water insoluble defoamer to break the foam when heat is applied. This foam is applied to a surface of the sheet material to provide stable foam thereon, and heat is employed to simultaneously cause the foam to collapse and dry the composition.

12 Claims, 4 Drawing Figures

FIG. 1
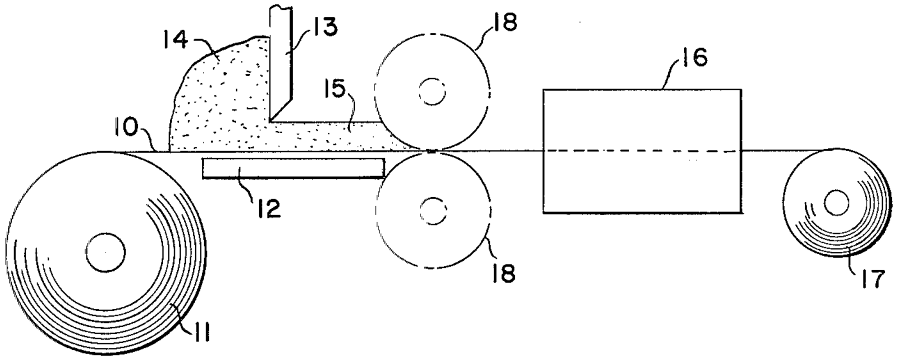
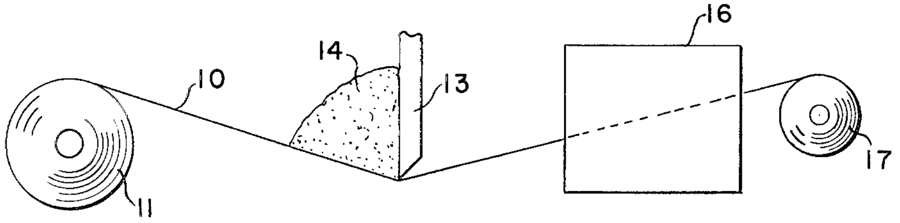
FIG. 2
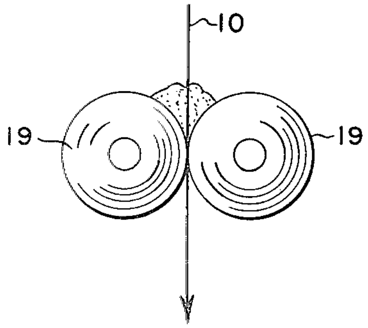
FIG. 3
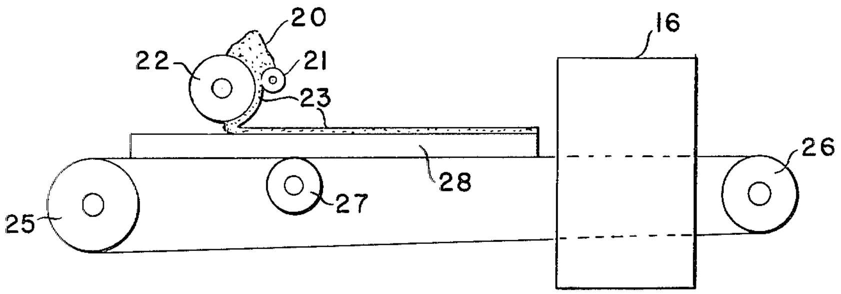
FIG. 4

HEAT COLLAPSING FOAM SYSTEM

DESCRIPTION

1. Technical Field

This invention relates to the treatment of sheet material, especially textile fabrics, with aqueous treating compositions which are in the form of a foam so as to minimize the amount of liquid which is applied, and thus minimize the energy needed to evaporate the volatile portion of the composition and the size of the ovens needed for this purpose.

2. Background Art

It is well known to foam aqueous treating compositions to facilitate application to sheet material and to minimize the drying requirements. Textile fabrics are particularly contemplated, and the preferred treatments are those involving the application of a resinous binder, especially those containing dissolved resin such as permanent press finishes.

One of the difficulties associated with foam application is that it is necessary to completely collapse the foam in order to avoid the presence of a foam structure in the final product. This problem is particularly difficult when the composition which is applied includes a resinous binder. One way to insure foam collapse is to employ an unstable foam which is especially formulated to substantially instantaneously collapse as it contacts the fabric. Unfortunately, it is difficult to control the amount of material applied to the fabric for this will vary with every change in the foam, the fabric, and the line speed. Very sophisticated and expensive apparatus is required, and a computer is needed to control it. Starting and stopping are particularly difficult and can result in variations in the treatment which extend over a significant length of the fabric being treated.

It is also known to apply a layer of a stable foam, as by knife application, and then pressure applied at the nip of a roller is used to force the foam to collapse. However, these stable foams do not always collapse completely, and foam or fibers or both may build up on the pressure rollers to disturb the textile treating operation.

Disclosure of Invention

In this invention, an aqueous foam composition which is sufficiently stable to be formed into a layer and to retain this layer form long enough to be handled, is applied to a sheet material and collapse of the foam structure is effected or completed by the application of heat. This provides a controllable foam system in which foam collapse is insured when heat is applied.

It will be understood that heat is normally employed as a part of the drying operation, so the treatment is simplified, and the apparatus requirements are eased. In comparison with instantly collapsing systems, the simplification of the apparatus is obvious. In comparison with pressure collapse, one can eliminate precisely controlled pressure rollers which impose substantial pressure. Unlike the application of an instantly collapsing foam, the amount of material applied to the fabric is easily and exactly controlled and change of speed as well as starting and stopping are easily achieved with minimal modification of the treatment as the speed of the system is changed. Since the very operation which dries the foam causes it to collapse, the foam structure is reliably removed from the final product where it is not desired. For the same reason, build up of material on the processing apparatus is minimized.

A pressure roller may be employed in this invention to cause penetration of the foam into the intersticies of a fabric being treated, and some foam collapse may be induced thereby. However, heat is still relied upon to remove the foam structure, and the pressure of the roller need not be appropriate to insure foam collapse. More particularly, pressures of about 20 to 60 psi are normally required for substantially complete cell collapse, and far less pressure is appropriate herein where the purpose of pressure application is different.

Heat collapsing foams are different from the usual foams. Normally, a foam is either poorly stable and collapses quickly when spread on a substrate, or it is stable and lasts a long time so that is must be mechanically worked, as by the application of pressure, to cause it to collapse. We have found that foams may be produced which are relatively stable in the sense that they can be formed in a layer which remains intact and does not perceptibly collapse during normal working time on an application machine. This is advantageous in that the layer can be formed to contain an exact amount of treating agent which is maintained uniform with time and without regard to the speed of the machine. In a beaker, the foams in this invention are stable for periods of from about 5 minutes to about 5 hours, though this is not a critical factor herein. Despite reasonable stability at temperatures of from 15° C. to 30° C., the foams collapse more and more rapidly as the temperature increases. In this invention practicality requires an oven baking temperature of at least about 150° F., more preferably at least 200° F.

In order to cause foam collapse with increasing temperature, we combine in the aqueous treating composition which is foamed, a water soluble surfactant which stabilizes the foam, and a relatively water insoluble defoamer. The presence of the defoamer at room temperature does not break the foam because it is poorly soluble, though the foams which are produced are not as uniformly fine bubbled as are commonly available in the art. Instead, when the foam is heated, the defoamer becomes more soluble, and chemically breaks the foam. This is important because it allows the foam to break where mechanical pressure has not been effective.

The defoamers are preferably surface active agents having a low HLB value of from 0.1 to 10.0, preferably 0.1 to 7.0, and these are usually fatty alcohols or ethoxylates thereof with ethylene oxide in small amount so as to retain water insolubility. The water soluble surfactants which maintain the foam have an HLB value of more than 8.5 (and at least 3.0 units higher than the defoamer), usually from 12 to 40. The weight proportions of water soluble surfactant to defoamer are not critical and may vary from 1 to 10 to 10 to 1, and even more in some instances. One must use enough water soluble high HLB surfactant to provide a foam which is stable in a layer long enough to handle, and the water insoluble defoamer must be present in an amount to break the foam when heated. Inclusion of the defoamer does impair the foam somewhat, but this is also not important. Foaming is normally carried out with air to a volume of from 2 to 20 times the unfoamed volume.

Mixtures which are useful herein are disclosed, though not to provide a heat collapsing foam, in the application of Christian Guth and Jorg Binz, Ser. No. 058,047, filed July 16, 1979 and now abandoned, and the disclosure of this application is incorporated herein by reference.

The invention will be more fully understood from a consideration of the accompanying drawings in which several forms of the invention are illustrated in diagrammatic form. In these drawings:

FIG. 1 shows the knife application of a foam layer which may be compressed into the fabric by optional rollers and then heated to collapse any remaining foam structure.

FIG. 2 is similar to FIG. 1 except that a floating knife is used to apply the foam and force the foam into the intersticies of the fabric which is treated;

FIG. 3 shows the foam being applied to a fabric during a vertical pass thereof between horizontally positioned rollers; and FIG. 4 shows the foam layer transferred to a tile being coated.

Referring more particularly to FIG. 1, a fabric 10 is unwound from a supply roller 11 and is passed over a supporting table 12 beneath a knife 13 which is spaced above the fabric. Foam is placed behind the knife where it piles up as indicated at 14 and passes beneath the knife to form a layer 15. The fabric 10 with the foam layer 15 thereon may be permitted to pass directly into the oven 16 where the foam simultaneously collapses and dries, and the treated fabric is then wound up on roller 17.

In some instances it is desired to cause the treating composition to more uniformly penetrate the fabric 10, and this is achieved by using the optional rollers 18 which are shown in phantom. Very little pressure is needed, and the foam does not normally fully collapse as a result of roller pressure. However, more uniform penetration is obtained when desired, and the heat encountered in oven 16 completes the collapse of the foam.

In FIG. 2, the fabric 10 runs under tension against the edge of knife 13. This forces a smaller amount of foam into the fabric which is then dried and collapsed in the oven 16. It will be noted that like numbers are applied to like parts to ease the burden of understanding.

FIG. 3 shows a vertical pass of the fabric 10 between rollers 19 which are horizontally arranged. The foam may be piled up on one or both sides of the fabric, depending upon whether the fabric is to be treated on one or both sides. Again, the pressure applied by the rollers need not be sufficient to completely collapse the foam, and the oven not shown in FIG. 2 would function to simultaneously dry the foam and collapse it so that the puffiness created by residual foam structure in the final product would not be present.

FIG. 4 illustrates a transfer process in which the foam 20 is piled up above rollers 21 and 22 with roller 21 being of nonadhesive material so that the layer of foam which is formed adheres to roller 22. This foam layer 23 is then transferred to a tile which is passed beneath roller 22 on belt 24 which runs around rollers 25 and 26. A roller 27 supports the tile 28 as it passes beneath roller 22 where it is coated with the transferred foam layer 23. The coated tile is then baked to collapse the foam in oven 29. In this system, since the foam is dried and collapsed at the same time, its penetration into a porous tile is minimized. This is particularly advantageous in the application of coatings and layers of adhesive.

It is desired to stress that many variations are permissible within the scope of this invention. Thus, the foam may be clear, dyed, or pigmented. The surface being treated may be imperforate, like paper, or it may be an ordinary textile fabric. The treatment may involve bleaching, dyeing, or various other treatments, especially including permanent press finishing in which the aqueous treating composition includes a dissolved aminoplast resin.

BEST MODE FOR CARRYING OUT THE INVENTION

This invention will now be illustrated in the following specific example which shows a typical permanent press application which constitutes the area in which this invention is presently considered to have its greatest impact.

EXAMPLE

The following is an illustrative composition which can be foamed and applied to drapery and table cloth fabrics in order to impart wash and wear properties to the fabrics.

| Component | Percent by Weight |
|---|---|
| 1-Ethylene-vinyl acetate aqueous emulsion copolymer containing 75 pts. vinyl acetate, 25 pts. ethylene, 3 pts. N-methylol allyl carbamate, and 2 pts. acrylamide and having a solids content of 45% | 7 |
| 2-Dimethylol dihydroxy ethylene urea (40% solids in water) | 50 |
| 3-High density polyethylene softener (25% solids in water) | 10 |
| 4-Aqueous emulsion polymer of methacrylic acid (25% solids) | 30 |
| 5-Sodium lauryl sulfate (30% solids in water) | 1 |
| 6-Emulsion of water-soluble foam stabilizer and water-insoluble defoamer (notel) | 2 |

Note 1

This mixture is provided by emulsifying 65 parts of coco fatty acid amide and 65 parts of cetyl alcohol in 865 parts of water with the aid of 5 parts of stearyl alcohol ethoxylated with 20 moles of ethylene oxide per mole of alcohol.

The above aqueous composition is foamed to a cup weight of 200 grams per liter (a blow ratio of about 4:1) and is applied to the fabric using a pair of rolls which apply very little pressure to force the foam into the fabric. The wet impregnated fabric contains uncollapsed cells and is dried by baking which serves to complete cell collapse. Two baking schedules are typical, e.g., 4 minutes at 280° F. and 30 seconds at 360° F.

What is claimed is:

1. A process of treating sheet materials with an aqueous treating composition comprising, providing an aqueous treating composition containing a water soluble surfactant for stabilizing a foam and a water-insoluble defoamer for breaking a foam when heat is applied to permit said composition to be foamed with gas to provide a foam which is stable in the form of a thin layer long enough to be handled and which will collapse completely when heated, foaming said composition, applying said foam to a surface of said sheet material to provide stable foam thereon, and heating said foam on said sheet material to simultaneously cause the foam to collapse and dry the composition.

2. A process as recited in claim 1 in which said foamed composition is applied to said sheet material to form a stable layer of foam on at least one surface thereof.

3. A process as recited in claim 2 in which said layer of foam is mechanically pressed into said sheet material to cause the aqueous composition to penetrate the interstices of said sheet material.

4. A process as recited in claim 1 in which said aqueous composition comprises a binder.

5. A process as recited in claim 1 in which said sheet material is porous and the simultaneous drying and collapse limit penetration of said treating composition into said sheet material.

6. A process as recited in claim 1 in which said sheet material is a textile fabric.

7. A process as recited in claim 1 in which said foam layer is formed on a first surface and is transferred therefrom to the surface of the sheet material to be treated.

8. A process as recited in claim 1 in which said foam layer is formed from a foam which is foamed with air to a volume of from 2 to 20 times its unfoamed volume.

9. A process as recited in claim 1 in which said aqueous treating composition comprises an adhesive and the sheet material with the foam layer thereon is pressed against another sheet of material prior to heating to simultaneously dry and collapse said foam, whereby said adhesive is prevented from migrating away from the glue line in the resulting laminate.

10. A process of treating textile fabric with an aqueous treating composition containing a water-soluble binder comprising, incorporating in said composition water-soluble surfactant having an HLB value of more than 8.5 to permit said composition to be foamed with gas to provide a foam which is stable in the form of a thin layer long enough to be handled, and water insoluble defoamer having an HLB value of from 0.1 to 7.0 to cause the foam to collapse completely when heated, foaming said composition, applying said foam to a surface of said fabric to provide stable foam thereon, and heating said foam on said fabric to simultaneously cause the foam to collapse and dry the composition.

11. A process as recited in claim 10 in which said water-soluble surfactant has a HLB value of from 12–40.

12. A process as recited in claim 10 in which said surfactant and defoamer are present in a weight ratio of from 1:10 to 10:1.

* * * * *